(12) United States Patent
Knittel et al.

(10) Patent No.: US 9,581,481 B2
(45) Date of Patent: Feb. 28, 2017

(54) AIR MASS FLOWMETER

(71) Applicant: CONTINENTAL AUTOMOTIVE GMBH, Hannover (DE)

(72) Inventors: Thorsten Knittel, Pentling (DE); Stephen Setescak, Pentling (DE)

(73) Assignee: Continental Automotive GmbH, Hannover (DE)

(*) Notice: Subject to any disclaimer, the term of this patent is extended or adjusted under 35 U.S.C. 154(b) by 110 days.

(21) Appl. No.: 14/440,302

(22) PCT Filed: Nov. 1, 2013

(86) PCT No.: PCT/EP2013/072852
§ 371 (c)(1),
(2) Date: May 1, 2015

(87) PCT Pub. No.: WO2014/068078
PCT Pub. Date: May 8, 2014

(65) Prior Publication Data
US 2015/0285665 A1    Oct. 8, 2015

(30) Foreign Application Priority Data
Nov. 2, 2012 (DE) .................. 10 2012 220 019

(51) Int. Cl.
*G01F 1/688* (2006.01)
*G01F 1/684* (2006.01)

(52) U.S. Cl.
CPC .......... *G01F 1/6888* (2013.01); *G01F 1/6845* (2013.01)

(58) Field of Classification Search
CPC .............................. G01F 1/6888; G01F 1/6845
See application file for complete search history.

(56) References Cited

U.S. PATENT DOCUMENTS

| | | | |
|---|---|---|---|
| 5,393,351 A | 2/1995 | Kinard et al. | |
| 5,629,482 A | 5/1997 | Vaitkus et al. | |
| 6,139,758 A | 10/2000 | Tu | |

FOREIGN PATENT DOCUMENTS

| | | |
|---|---|---|
| DE | 44 07 209 | 9/1995 |
| DE | 100 57 403 | 5/2001 |
| JP | S58 139481 | 8/1983 |
| JP | 2000-292234 | 10/2000 |
| JP | 2002-081983 | 3/2002 |
| WO | WO 03/089884 | 10/2003 |

*Primary Examiner* — Erika J Villaluna
(74) *Attorney, Agent, or Firm* — Cozen O'Connor (57) ABSTRACT

An air mass flowmeter having a sensor element of microelectromechanical design, a heating element, and a temperature sensor element. The temperature sensor element is a thermocouple assembly having a multiplicity of thermocouples connected in series. Each thermocouple is a first metal conductor and a second, different metal conductor connected to one another at one end by a connection point. To reduce the distortion of measurement results by the soiling of the sensor element, the first thermocouple(s) and the last thermocouple(s) of the thermocouple assembly are polarized such that an electrical current flows first through the second metal conductor and then through the first metal conductor in each case. The remaining thermocouples of the thermocouple assembly are polarized such that the electrical current flows first through the first metal conductor and then through the second metal conductor.

8 Claims, 6 Drawing Sheets

AIR MASS FLOWMETER

CROSS REFERENCE TO RELATED APPLICATIONS

This is a U.S. national stage of application No. PCT/EP2013/072852, filed on Nov. 1, 2013. Priority is claimed on German Application No.: DE102012220019.3 filed Nov. 2, 2012, the content of which is incorporated herein by reference.

BACKGROUND OF THE INVENTION

1. Field of the Invention

The invention relates to an air mass flowmeter having a microelectromechanical sensor element, a heating element, and at least one temperature sensor element. The temperature sensor element is a thermal element. The thermal element comprises a large number of thermocouples connected in series and through which an electric current flows in succession. A thermocouple comprises a first metal conductor and a second metal conductor connected to one another in each case at an end by a connecting point, the first metal conductor and the second metal conductor are formed from different metals.

2. Detailed Description of the Prior Art

Air mass flowmeters are used, for example, in motor vehicles for determining the air mass drawn in by an internal combustion engine. On the basis of information about a drawn-in air mass, which is as reliable as possible, a combustion process can be optimized by an electronic control system of the internal combustion engine to precisely a quantity of fuel to the air mass supplied to the respective combustion chambers. This results in better energy utilization together with a low level of pollution emissions.

DE 44 07 209 A1 discloses an air mass flowmeter inserted into an intake duct for determining an air mass, wherein a defined proportion of the total flow flows through the air mass sensor. The mass sensor is in the form of an insertion-duct air mass flowmeter. The air mass flowmeter comprises a sensor element, which is arranged in a measuring duct, electronics, which are arranged in a housing for evaluating and/or detecting the measurement values from the sensor element, and also an outlet duct on the other side of the sensor element. For a space-saving arrangement, the specified ducts or air-guiding paths are U-, S- or C-shaped, with the result that an apparatus that is compact overall and is designed as an insertion element is formed.

U.S. Pat. No. 5,393,351 A1 discloses an air mass flowmeter in which the temperature sensor elements, which are in the form of thermal elements, in the edge region of the sensor element are protected by additional thermal elements.

DE 100 57 403 A1 discloses a thermoelectric sensor of the thermopile type. The output signals from the thermoelectric sensor of the thermopile type can be set in such a way that a thermoelectric structure for setting the sensitivity is connected in series with a plurality of thermoelectric structures which form a thermopile.

An air mass flowmeter designed in accordance with the WO 03/089884 A1 is in the form of a hot-film manometer has proven effective in principle.

During the development of modern air mass flowmeters that operate on the basis of sensor elements in the form of microelectromechanical systems (MEMS), it has become apparent that the measurement results of the sensor elements are influenced in a particularly disadvantageous way by contamination. Contamination can be caused by, for example, oil droplets in the air mass flow, and results in signal drift in the sensor element over time. The signal drift may lead to incorrect measurement values for the air mass flow. However, sensor elements in the form of microelectromechanical systems have a large number of advantages that should not be dispensed with.

SUMMARY OF THE INVENTION

It is an object of the invention to eliminate the corruption of the measurement results due to contamination of the sensor element or at least to keep it within tight limits.

According to one embodiment of the invention, a first thermocouple or first thermocouples and the last thermocouple or the last thermocouples of the thermal element are polarized such that the electric current in each case initially flows through the second metal conductor and then the first metal conductor, wherein the remaining thermocouples of the thermal element, which are arranged between the first thermocouple or the first thermocouples and the last thermocouple or the last thermocouples, are polarized in such a way that the electric current in each case initially flows through the first metal conductor and then the second metal conductor. When the first thermocouple or the first thermocouples and the last thermocouple or the last thermocouples of the thermal element are polarized in such a way that the electric current in each case initially flows through the second metal conductor and then the first metal conductor, the corruption phenomena in the measurement results are largely compensated for by contamination effects in the edge region of the thermal element since the thermocouples of reversed polarity are located in the edge region of the temperature sensor element. Reversing the polarity of the first and last thermocouple reduces the signal strength of the thermal element to a certain extent, wherein a thermal element can comprise 1000 or more thermocouples, and therefore some thermocouples of reversed polarity have only a very minor effect on the signal strength at the start and the end of the thermal element. However, the long-term stability of the signals is significantly improved by this design of the thermal element since the contamination effects now have hardly any influence on the measurement result.

In one embodiment of the invention, the sensor element has a first temperature sensor element and a second temperature sensor element. A temperature difference in the mass flow can be determined by a first temperature sensor element and a second temperature sensor element, it being possible to determine the mass flow itself using the temperature difference. In this case, it is advantageous when the first temperature sensor element is arranged upstream in relation to the heating element, and the second temperature sensor element is arranged downstream in relation to the heating element.

BRIEF DESCRIPTION OF THE DRAWINGS

Further features and advantages of the invention will be specified below by describing an exemplary embodiment with reference to the figures in the drawings. In the text which follows, the same terms and reference symbols are used for identical components throughout the various figures, in which.

DETAILED DESCRIPTION OF THE PRESENTLY PREFERRED EMBODIMENTS

Figure 1:
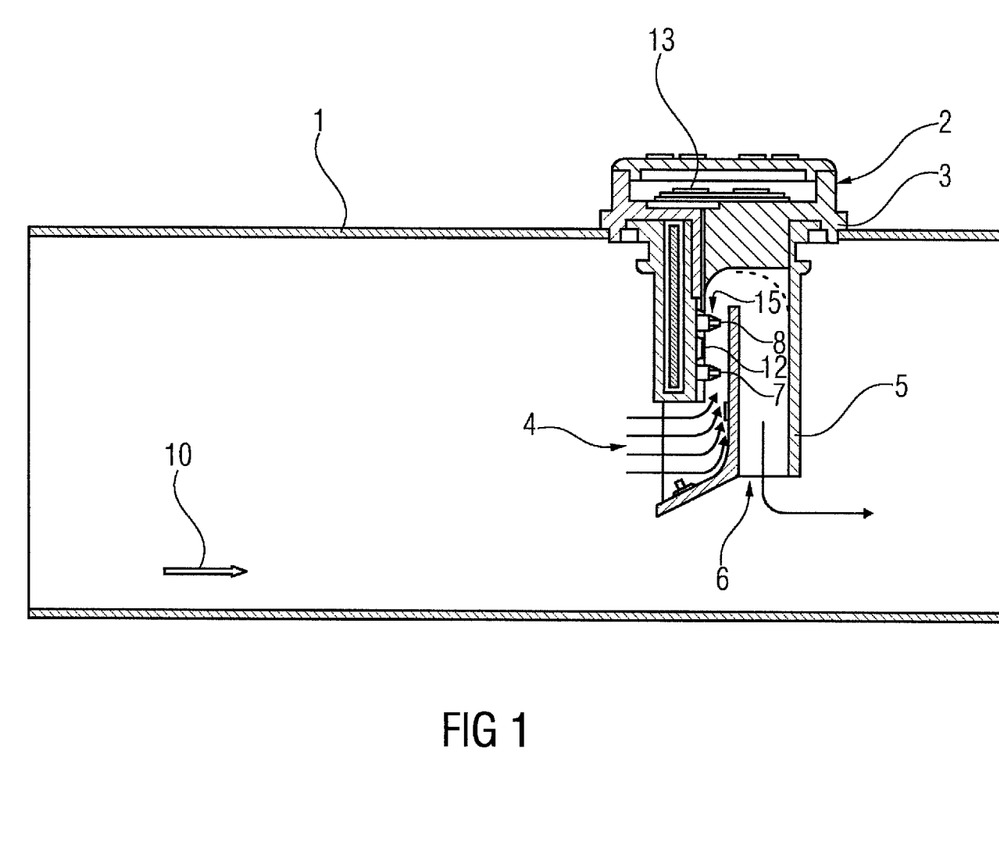
FIG. 1 is an air mass flowmeter.

FIG. 1 shows a mass flow sensor in the form of an air mass flowmeter 2. In this example, the air mass flowmeter 2 is shown as an insertion finger inserted into an intake pipe 1 and is fixedly connected to the intake pipe 1. The intake pipe 1 leads a mass flow, which is an air mass flow 10, to the cylinders of an internal combustion engine. To efficiently burn the fuel in the cylinders of an internal combustion engine, it is necessary to obtain accurate information about the available air mass. Based on the air mass available, it is possible to infer the amount of the available oxygen necessary for burning the fuel injected into the cylinder. Furthermore, the air mass flowmeter 2 in FIG. 1 has a first temperature sensor element 7 and a second temperature sensor element 8. The first temperature sensor element 7 and the second temperature sensor element 8 are arranged at different locations. The temperature sensor elements 7, 8 are generally formed from resistors or thermopiles that assume different resistance values in accordance with the temperature prevailing at the respective temperature sensor element. A heating element 12 is arranged between the first temperature sensor element 7 and the second temperature sensor element 8. The portion of the air mass flow that enters the housing 3 of the air mass flowmeter 2 through the inlet opening 4 initially flows over the first temperature sensor element 7 and then the heating element 12, after which the air mass flow 10 reaches the second temperature sensor element 8 and is conducted along the auxiliary pipe 5 to the outlet opening 6 in the air mass flowmeter 2. The air mass flow 10 reaches the first temperature sensor element 7 at a specific temperature. This temperature is detected by the first temperature sensor element 7 as the absolute temperature. The air mass flow 10 then passes over the heating element 12, wherein the air mass flow 10 is heated to a greater or lesser extent depending on the mass flowing past. When the heated air mass flow 10 reaches the second temperature sensor element 8, the temperature of the air mass flow 10 is determined as the absolute temperature by the second temperature sensor element 8. The air mass flowing past can be determined from the difference between the absolute temperature measured by the first temperature sensor element 7 and the absolute temperature measured by the second temperature sensor element 8. The air mass flowmeter 2 itself can contain an evaluation electronics system 13 which evaluates the measurement signals from the first temperature sensor element 7 and from the second temperature sensor element 8. The information about the air mass flow 10 obtained in this way is passed onto a motor controller, not illustrated here.

It should be noted that the invention is described, by way of example, using an air mass flowmeter, but this does not mean that the invention is restricted to measuring air mass flows. The apparatus according to the invention can be used to advantageously detect and measure other mass flows too. It is feasible, for example, to use the apparatus according to the invention to measure the mass flow of hydrocarbon compound in a rinse line of a hydrocarbon tank.

Figure 2:
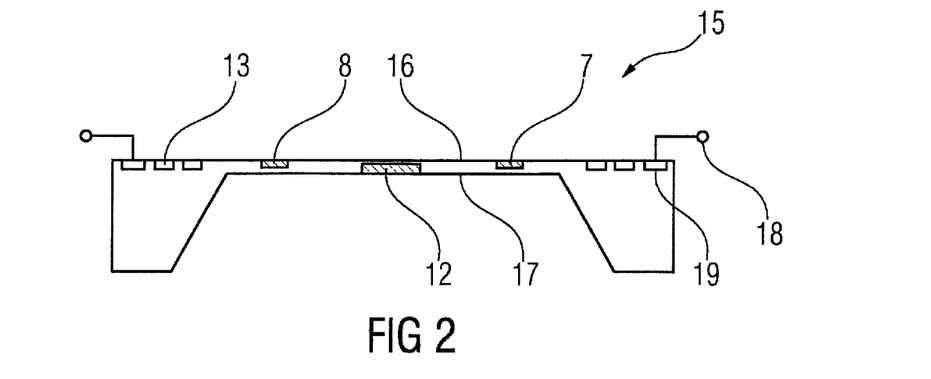
FIG. 2 is a sensor element in the form of a microelectromechanical system (MEMS)

FIG. 2 shows a sensor element 15 for an air mass flowmeter 1. The sensor element 15 is a MEMS on a single silicon chip. The sensor element 15 operates in accordance with the differential temperature method with which the mass of the air quantity 10 flowing past is determined. A first temperature sensor element 7 and a second temperature sensor element 8 are formed on a thin diaphragm 17. The first and the second temperature sensor element 7, 8 are located in different locations on the surface of the diaphragm 17. A heating element 12 is arranged between the first temperature sensor element 7 and the second temperature sensor element 8. An evaluation electronics system 13 can immediately evaluate the measurement signals from the temperature sensor elements 7, 8 and convert said measurement signals into a signal that is proportional to the air mass flow 10. The evaluation electronics 13 are integrated onto the sensor element 15, which is designed as a microelectromechanical system. However, the evaluation electronics system 13 can be integrated in a downstream device equally well. The information about the air mass flow 10 is then passed on to a downstream electronic motor controller, not illustrated here, via connection pads 19 and connection wires 18.

Figure 3:
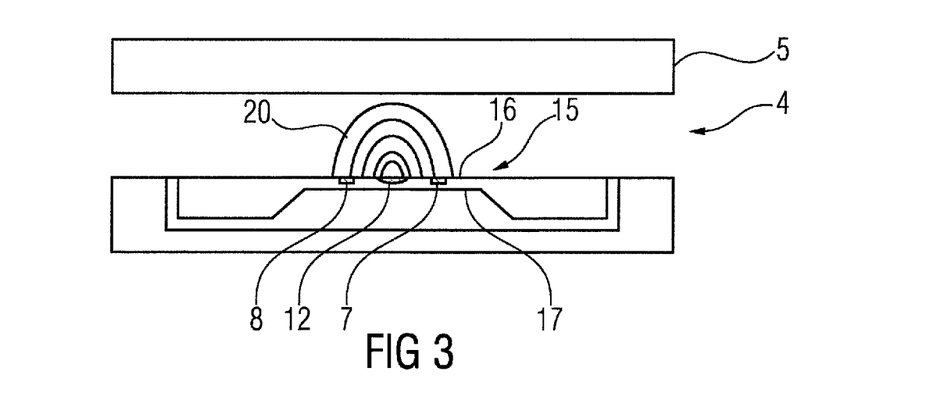
FIG. 3 is a sensor element which is in the form of a MEMS arranged in an auxiliary pipe in the air mass flowmeter.

FIG. 3 shows a sensor element 15 for an air mass flowmeter 2, which sensor element is in the form of a MEMS formed on a single substrate. The substrate is arranged in an auxiliary pipe 5 of the air mass flowmeter 2. In FIG. 3, no air mass flow 10 flows through the inlet opening 4, as will be the case with the internal combustion engine turned off. This state is also called the zero mass flow state. When the heating element 12 on the sensor element 15 is supplied with electrical energy, the symmetrical temperature distribution 20 illustrated here occurs around the heating element 12. Therefore, the first temperature sensor element 7 and the second temperature sensor element 8 measure the same absolute temperature and, after calculating the difference between the temperature measurement signals from the temperature sensor elements 7, 8, the evaluation electronics system 13 identifies that there is no air mass flow 10 in the auxiliary pipe 5 of the air mass flowmeter 2. However, this ideal equality between the temperature measurement signals given zero mass flow can be disturbed, for example, by impurities on the sensor element 15.

Figure 4:
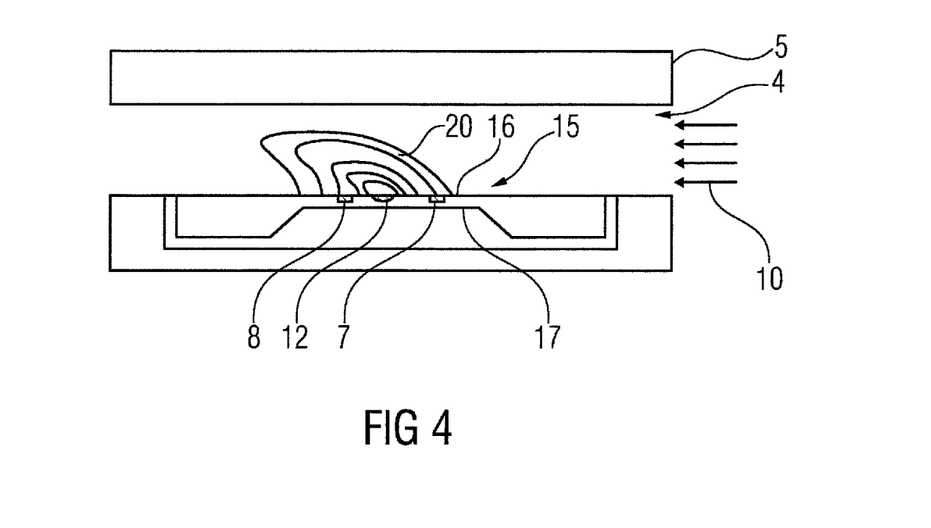
FIG. 4 is a situation in which the air mass flow flows into the auxiliary pipe of the air mass flowmeter through the inlet opening.

FIG. 4 shows a situation in which an air mass flow 10 flows into the auxiliary pipe 5 of the air mass flowmeter 2 through the inlet opening 4. The temperature distribution 20 around the heating element 12 is now clearly visibly shifted in the direction of the second temperature sensor element 8. The second temperature sensor element 8 measures a significantly higher temperature than the first temperature sensor element 7. The air mass flow 10 can now be determined by establishing the differential temperature between the two temperature sensor elements 7, 8 in the evaluation electronics system 13. However, the influences of contamination 9 (FIGS. 5 and 7) on the sensor element 15 would still have an effect and they would superimpose themselves on the measurement results. The sum of the temperatures likewise reacts to the mass flow 10. Furthermore however, the sum of the temperatures also reacts to the thermal properties of the air mass, such as the thermal capacity and/or the thermal conductivity of the air mass flow 10 flowing past. If, for example, the thermal conductivity of the air mass increases with the same air mass flow 10, the system cools down and the sum of the temperatures becomes significantly lower. The differential temperature between the first temperature sensor element 7 and the second temperature sensor element 8 remains, however, unchanged in a first approximation. Therefore, by means of the sum signal of the first temperature sensor element 7 and of the second temperature sensor element 8, it is possible to measure a change in the thermal properties, such as the thermal capacity or the thermal conductivity, of the air mass. If the differential temperature signal is then set off against the sum temperature signal, the changed thermal conductivity and/or the changed thermal capacity of the air mass flowing past can be inferred.

Figure 5:
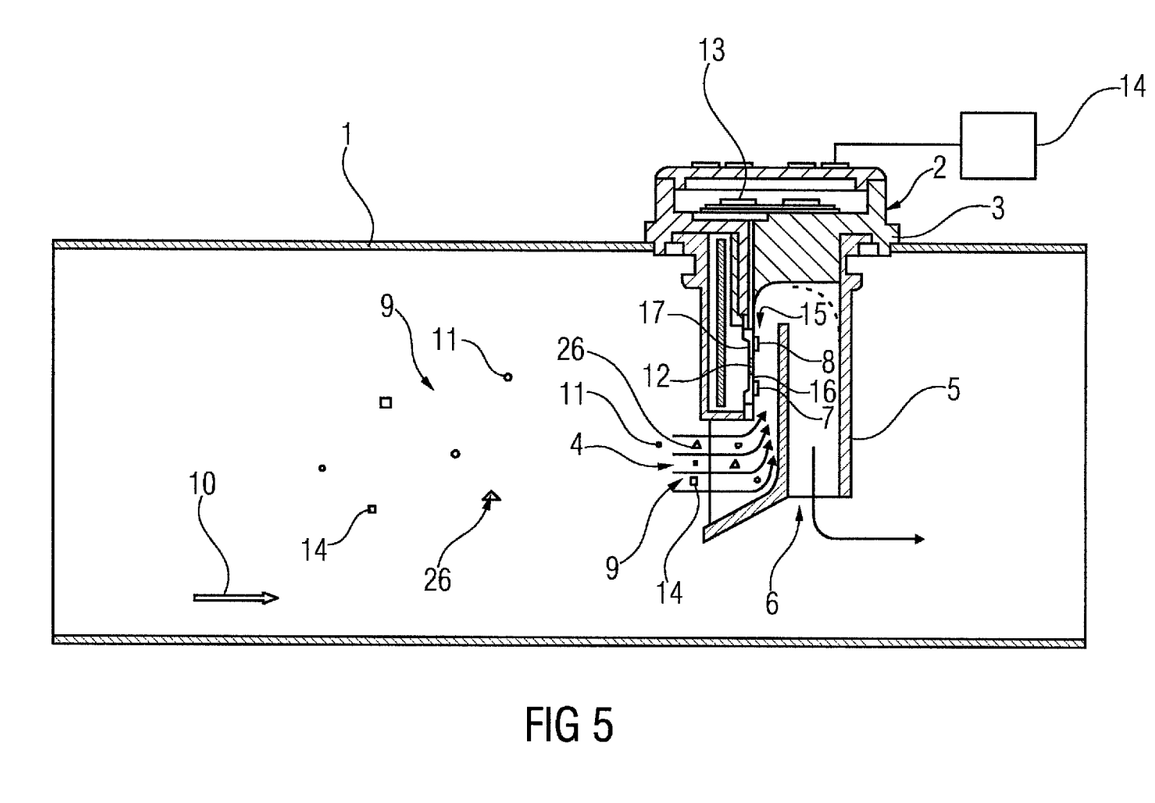
FIG. 5 is the sensor element, which is in the form of a MEMS in an air mass flowmeter integrated in an intake pipe as an insertion finger.

FIG. 5 shows the sensor element 15 of the air mass flowmeter in the form of a MEMS, in an air mass flowmeter 2, which is integrated in an intake pipe 1 as an insertion finger. The air mass flow 10 reaches the inlet opening 4 and enters the auxiliary pipe 5 in this case too. The first temperature sensor element 7 and the second temperature sensor element 8 can be seen on the surface 16 of the diaphragm 17. The heating element 12 is arranged between the first temperature sensor element 7 and the second temperature sensor element 8. The air mass flow 10 first reaches the first temperature sensor element 7, then flows over the heating element 12 to reach the second temperature sensor element 8. The first temperature sensor element 7 is arranged upstream in relation to the heating element 12, and the second temperature sensor element 8 is arranged downstream in relation to the heating element 12.

FIG. 5 shows that the air mass flow 10 also includes contamination 9. For example, water droplets 26, oil droplets 11 and/or particles of dust 14 are transported by the air mass flow 10 to the air mass flowmeter 2. The contamination 9 passes through the inlet opening 4 in the air mass flowmeter 2 to the sensor element 15. If the contamination 9 is deposited in the region of the first temperature sensor element 7 and the second temperature sensor element 8, severe corruption of the measurement value for the air mass flow 10 can occur over time. Since this corruption builds up increasingly as a result of the accumulation of the contamination on the sensor element 15 over a long time period, the term signal drift of the air mass flowmeter 2 is also used in this context. This signal drift is undesired and should be suppressed and/or compensated for.

Figure 6:
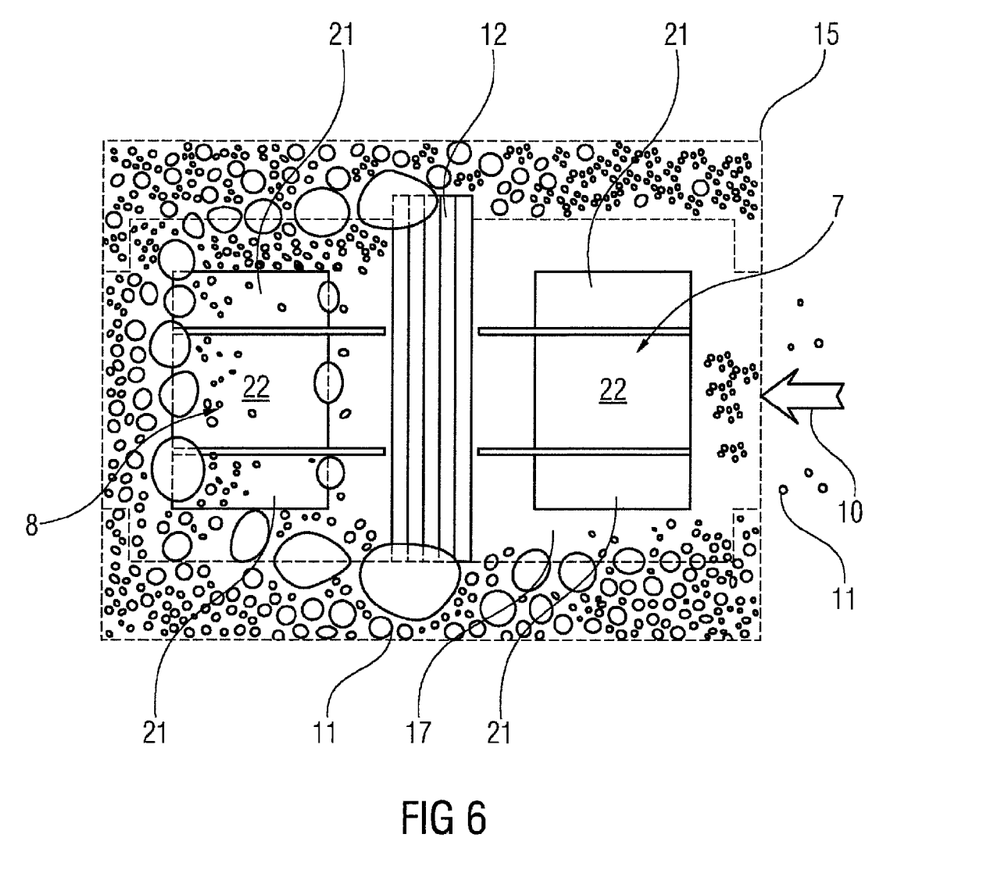
FIG. 6 is the sensor element with the first temperature sensor element and the second temperature sensor element.

FIG. 6 shows the sensor element 15 with the first temperature sensor element 7 and the second temperature sensor element 8 and also the heating element 12 which is arranged between the temperature sensor elements 7 and 8. The direction of the air mass flow 10 is illustrated by the arrow 10. Therefore, the first temperature sensor element 7 is located upstream of the heating element 12 and the second temperature sensor element 8 is arranged downstream of the heating element 12 in the flow direction of the air mass flow 10. In this example, both the first temperature sensor element 7 and the second temperature sensor element 8 are each electrical series circuits made up of a measurement resistor 22 and at least two comparison resistors 21. It is apparent that the measurement resistors 22 are arranged in the inner region of the thin diaphragm, and the comparison resistors 21 are arranged in the edge region of the diaphragm 17.

Furthermore, FIG. 6 shows that contamination 9, which in this context is predominantly oil droplets 11, transported with the mass flow 10 to the sensor element 15. In particular, the oil droplets 11 are deposited on the sensor element 15. It is clearly apparent that the depositing of the oil droplets 11 on the sensor element 15 takes place to a particularly pronounced extent in the region of the second sensor element 8, which is arranged downstream of the heating element 12 in the direction of flow of the air mass flow 10. This asymmetrical depositing of oil droplets 11 on the sensor element 15 leads to signal drift that ultimately leads to corruption of the absolute temperature detected by the sensor element 15, and therefore to corruption of the measurement value for the air mass flow 10. Furthermore, the contamination is deposited in the edge region of the diaphragm 17. The asymmetrical depositing of oil droplets 11 has physical reasons which originate, in particular, from the relatively high temperature in the region of the second sensor element 8 and from the temperature gradient in the edge region of the diaphragm 17.

Figure 7:
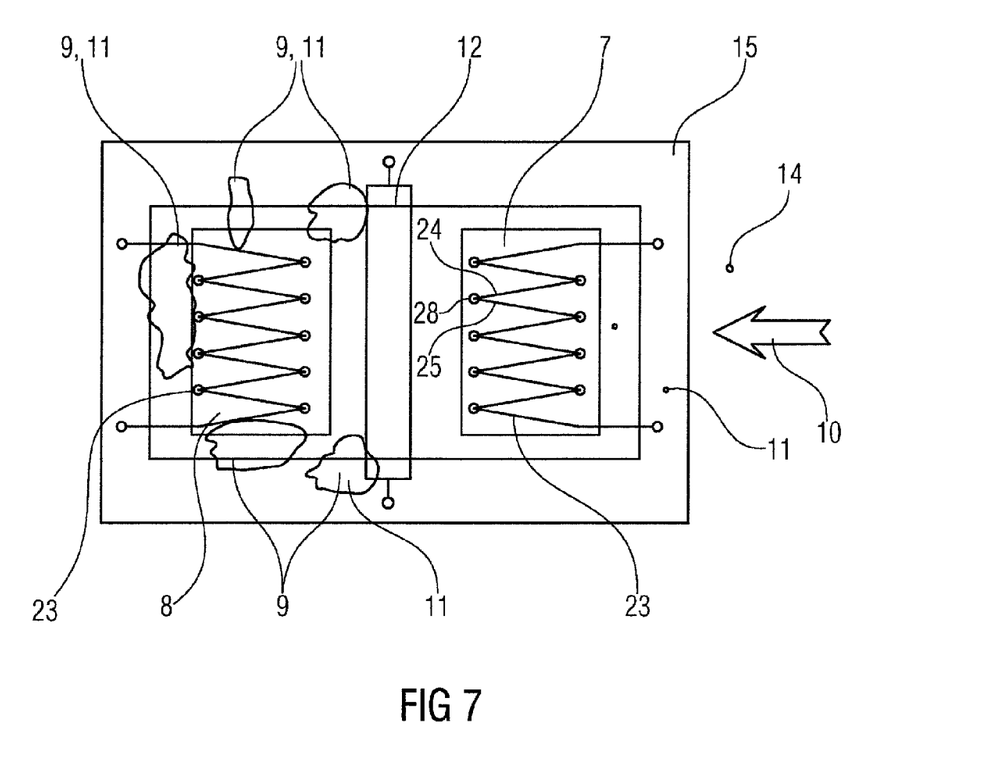
FIG. 7 is the sensor element of an air mass flowmeter with thermopiles.

FIG. 7 shows the sensor element 15 of an air mass flowmeter 2. The first temperature sensor element 7 and the second temperature sensor element 8 of this sensor element 15 are in the form of respective thermal elements 23. Thermal elements 23, which are also called thermopiles 23, convert heat into electrical energy. Thermal elements 23 comprise thermocouples which have wires which are composed of two different metals and that are connected to one another at one end. A temperature difference generates an electrical voltage on account of the flow of heat in the metal.

The production of an electrical potential difference between two points of different temperature of a conductor is called the Seebeck effect. The potential difference is approximately proportional to the temperature difference and depends on the conductor material. If the ends of a single conductor for measurement are at the same temperature, the potential differences always cancel each other out. If, however, two different conductor materials are connected to one another, a thermal element 23 is produced. In measurement systems based on the Seebeck effect, a very large number of individual thermocouples 23 are generally connected electrically in series.

When selecting material pairs for measurement purposes, the intention is to achieve the highest possible generated thermal voltage together with a high degree of linearity between the change in temperature and the change in voltage. The thermal elements 23 shown in FIG. 7 consist of a sequence of a respectively first metal 24 which is connected to a second metal 25 at a connecting point 28.

FIG. 7 clearly shows that contamination 9 is deposited predominantly in the form of oil droplets 11 in the region of the second temperature sensor element 8, which is formed from a thermal element 23. This contamination 9 leads to corruption of the absolute temperatures measured by the temperature sensor elements 7 and 8. The resulting signal drift has already been mentioned in the description of the abovementioned figures.

Figure 8:
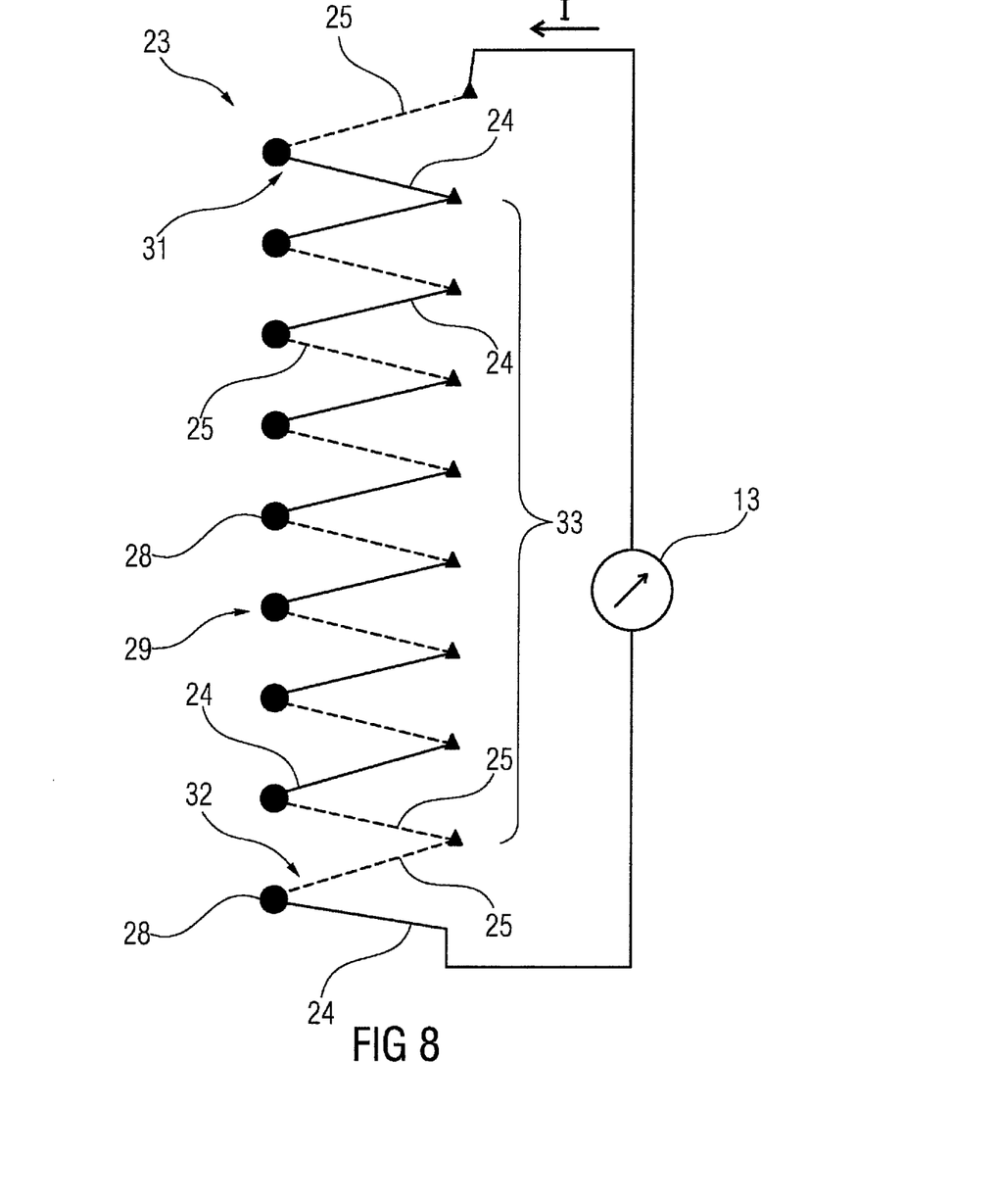
FIG. 8 is a temperature sensor element in the form of a thermal element.

FIG. 8 shows a temperature sensor element which is in the form of a thermal element 23, as can be formed, for example, on the sensor element 15 as a first temperature sensor element 7 and as a second temperature sensor element 8. The thermal element 23 exhibits a large number of thermocouples 29. The number of thermocouples 29 can be 1000 or more per thermal element 23. A thermocouple 29 is made up of a first metal conductor 24 and a second metal conductor 25. The first metal conductor 24 and the second metal conductor 25 are composed of different metals. The first metal conductor 24 can, for example, be composed of iron, while the second metal conductor 25 is formed from copper wire. The first metal conductor 24 and the second metal conductor 25 are electrically connected to one another at a connecting point 28. A thermal element 23 is formed by a large number of thermocouples 29 connected to one another electrically in series. FIG. 8 shows that the first thermocouple 31 is polarized in such a way that the electric current I initially flows through the second metal conductor 25, and the electric current I then flows through the first conductor 24. Even in the case of the last thermocouple 32, the sequence of the metal conductors is selected in such a way that the electric current I initially flows through the second metal conductor 25 and then the first metal conductor 24. The remaining thermocouples 33 are polarized in such a way that the electric current I initially flows through the first metal conductor 24, and the electric current then flows through the second metal conductor 25. The reversal of polarity, that is to say the change in the sequence of the metal conductors, of the first thermocouple 31 or of the first thermocouples 31 and of the last thermocouple 32 or of the last thermocouples 32 of the thermal element in relation to the remaining thermocouples 33 of the thermal element leads to a signal characteristic of the entire thermal element 23 that is stable over a very long time. Contamination that is deposited, in particular, in the edge region, that is to say in the region of the thermocouples of reversed polarity, of the second temperature sensor element 8, has hardly any effect on the signal quality and the long-term stability of the measurement results of the temperature sensor element owing to the inventive design of the thermal element 23. A thermal element 23 which is designed in accordance with FIG. 8 therefore has a high signal stability and provides accurate and high-quality measurement results over a very long period of time.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An air mass flowmeter comprising:
   a sensor element configured as a microelectromechanical element comprising:
   a heating element; and
   at least one temperature sensor element,
   wherein the at least one temperature sensor element is a thermal element having a plurality of thermocouples connected in series and configured as a path for an electric current,
   wherein each thermocouple comprises:
     a first metal conductor formed from a first metal;
     a second metal conductor formed from a second metal that is different than the first metal; and
     a connecting point at which a respective end of each of the first metal conductor and the second metal conductor are connected to one another, and
   wherein at least one first thermocouple and at least one last thermocouple are polarized such that the electric current initially flows through the second metal conductor and then the first metal conductor,
   wherein remaining thermocouples of the thermal element arranged between the at least one first thermocouple and the at least one last thermocouple are polarized such that the electric current initially flows through the first metal conductor and then the second metal conductor.

2. The air mass flowmeter as claimed in claim 1, wherein the at least one temperature sensor element comprises first temperature sensor element and a second temperature sensor element.

3. The air mass flowmeter as claimed in claim 2, wherein the first temperature sensor element is arranged upstream of the heating element and the second temperature sensor element is arranged downstream of the heating element.

4. The air mass flowmeter as claimed in claim 3, wherein the first metal is one of iron and copper.

5. The air mass flowmeter as claimed in claim 3, wherein the sensor element further comprises a diaphragm upon which the heating element, the first temperature sensor element, and the second temperature sensor element are arranged.

6. The air mass flowmeter as claimed in claim 5, wherein the first temperature sensor element, and the second temperature sensor element each comprise a first comparison resistor arranged in series before the plurality of thermocouples and a second comparison resistor arranged in series after the plurality of thermocouples.

7. The air mass flowmeter as claimed in claim 6, wherein the respective comparison resistors are arrange proximate to a respective edge of the diaphragm.

8. The air mass flowmeter as claimed in claim 5, wherein each temperature sensor element comprises at least 1000 thermocouples.

* * * * *